(12) United States Patent
Kimura et al.

(10) Patent No.: US 6,276,223 B1
(45) Date of Patent: Aug. 21, 2001

(54) MOTOR-OPERATED CYLINDER

(75) Inventors: Kunimasa Kimura; Shigehiro Toyoda, both of Toyokawa; Isao Murata, Hoi-gun, all of (JP)

(73) Assignee: Sintokogio, Ltd., Nagoya (JP)

( * ) Notice: Subject to any disclaimer, the term of this patent is extended or adjusted under 35 U.S.C. 154(b) by 0 days.

(21) Appl. No.: 08/820,099

(22) Filed: Mar. 19, 1997

(51) Int. Cl.[7] ............... F16H 27/02; F16H 29/02
(52) U.S. Cl. ............... 74/89.15; 74/424.8 R; 74/388 PS
(58) Field of Search ............... 74/89.15, 424.8 R, 74/424.8 VZ, 388 PS

(56) References Cited

U.S. PATENT DOCUMENTS

| | | | |
|---|---|---|---|
| 3,824,905 | * | 7/1974 | Jablonsky ............... 74/89.15 X |
| 4,498,350 | * | 2/1985 | Ross ............... 74/89.15 O |
| 4,876,906 | * | 10/1989 | Jones ............... 74/89.15 O |
| 5,381,702 | * | 1/1995 | Ohno ............... 74/89.15 O |

* cited by examiner

*Primary Examiner*—David Fenstermacher
(74) *Attorney, Agent, or Firm*—Limbach & Limbach L.L.P.

(57) ABSTRACT

A motor-operated cylinder is provided, wherein the rotational movement of the output shaft of a motor is converted into a linear movement by a thread mechanism 3, with the least possible load applied to the thread mechanism 3 when an object starts to be moved. The motor-operated cylinder is equipped with a booster 14 so that propelling forces exerted by both the thread mechanism 3 and booster 14 simultaneously act on a retractable rod 6.

3 Claims, 3 Drawing Sheets

MOTOR-OPERATED CYLINDER

FIELD OF THE INVENTION

This invention relates to improvements of a motor-operated cylinder wherein the rotational movement of the output shaft of a motor is converted into a linear movement by a thread mechanism.

BACKGROUND OF THE INVENTION

In a case where, for example, an object on a roller conveyor is moved by being pushed with the conventional so-called motor-operated cylinder, the weight of the object, the resistance caused by the static friction of ball bearings acting on the rollers, and a load (reaction) to accelerate the object to a given speed, are applied simultaneously to the front end of the retractable rod of the cylinder when the object starts to be moved. Since the resistance caused by the static friction of the ball bearings acting on the rollers when the movement of the object starts is far greater than that caused by the dynamic friction of the ball bearings acting on the rollers during the movement of the object, a significant load is applied to the retractable rod of the motor-operated cylinder when the object starts moving. As a result, there is a problem in that the threaded part of the thread mechanism quickly wears away, so that in general the life of the motor-operated cylinder shortens.

This invention was made considering the above circumstances. Its purpose is to provide an improved motor-operated cylinder, wherein only the least possible load is applied to the thread mechanism thereof when an object to be moved starts moving.

SUMMARY OF THE INVENTION

To achieve the above object the motor-operated cylinder of this invention is constituted such that a booster is added to a retractable rod so as to have propelling forces exerted by both the thread mechanism and the booster act simultaneously on the retractable rod.

DETAILED DESCRIPTION OF THE INVENTION

Figure 1:
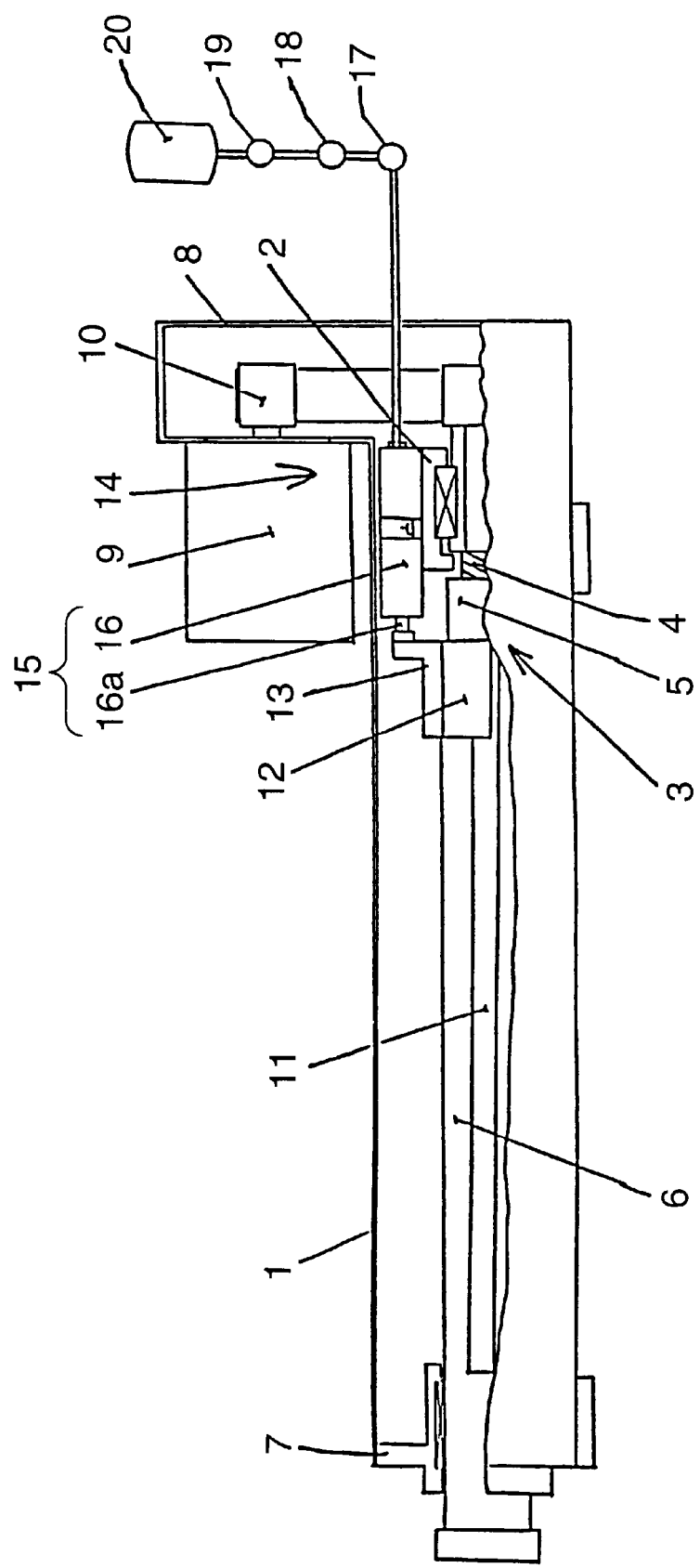
FIG. 1 is a partially sectional elevation showing a first embodiment of this invention.
Figure 2:
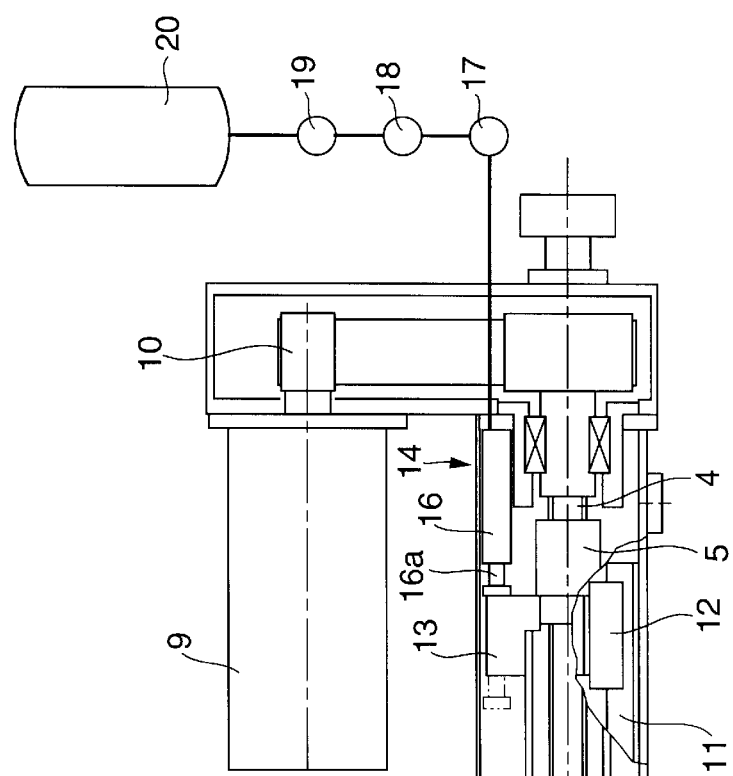
FIG. 2 is a side cross-sectional view of the FIG. 1 apparatus, partially cut away to show a cross-sectional view of elements 11 and 12 in a plane parallel to the plane of the rest of FIG. 2.
Figure 3:
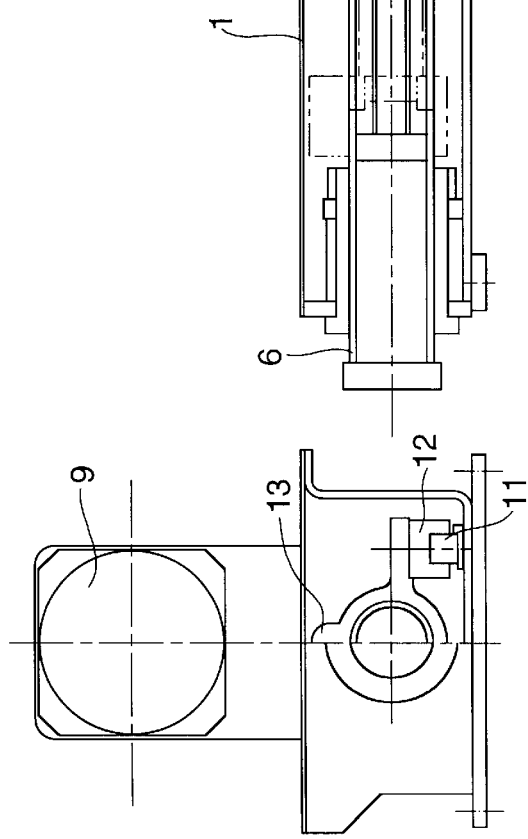
FIG. 3 is an end view of the FIG. 2 apparatus, partially cut away to show a cross-sectional view of elements 11, 12, and 13 in a plane perpendicular to the planes of FIG. 2.

A first embodiment of this invention will now be described by reference to FIG. 1. As shown in the drawing, a ball-bearing block 2 is fixed in a cylindrical body 1, extending in a horizontal direction, at its right side (as viewed from the front). One end part (the right side) of a threaded shaft 4 of a ball-thread mechanism 3 is fitted in the ball-bearing block 2. One end part (the right side) of a hollow retractable rod 6, which holds the threaded shaft 4, and which extends coaxially within the cylindrical body 1, is fixed to a nut 5, which has built-in balls of the ball-thread mechanism 3. The other end part (the left side) of the retractable rod 6 slidably passes through a lid 7 fixed to the left end of the cylindrical body 1. A casing 8 is mounted on the right end of the cylindrical body 1. A horizontal motor 9 is mounted on the left outer side of the casing 8. The output shaft of the motor 9 and the right end of the threaded shaft 4 are connected by a transmission mechanism 10 consisting of a belt and a belt pulley.

A rail member 11, extending along, and in the same direction as, the cylindrical body 1, is mounted on its inner side. A slider 12, which prevents the retractable rod 6 from rotating by slidably engaging the rail member 11, is fixed to the right end of the retractable rod 6. The slider 12 has on its upper surface a projection member 13. A cylinder mechanism 15, which constitutes a part of the booster 14, is mounted on the upper surface of the ball-bearing block 2. This cylinder mechanism 15 is structured such that when the retractable rod 6 has contracted a certain distance after a cylindrical body 16 of the cylinder mechanism 15 has expanded in the same direction as that of the rod 6, the front end of its output rod 16a starts to abut the projection member 13. A check valve 17, a throttle valve 18, a closing valve 19, and an accumulator 20 with a built-in pressurized gas, all of which are communicatively connected in that order to constitute the remaining part of the booster 14, are disposed on the opposite side of the output rod 16a.

The operation of the thus-constituted motor-operated cylinder when it is applied to an object on a roller conveyor (not shown) will now be explained. As is clear from the drawing, the retractive rod 6 is contracted by the reverse drive of the motor 9, and the output rod 16a of the cylinder mechanism 15 of the booster 14 is pushed into the cylindrical body 16 to be contracted. Thus a part of the pressure oil in the body 16 is returned into the accummulator 20 by being passed through the check valve 17, throttle valve 18, and closing valve 19, in that order, to be pressurized therein.

To move the object under this condition, i.e., when the closing valve 19 and check valve 17 are opened while the motor 9 is started, the rotational force of the output shaft of the motor 9 is transmitted via the transmission mechanism 10 to the threaded shaft 4 of the ball-thread mechanism 3 so that the shaft 4 starts to rotate. The nut 5 of the ball-thread mechanism 3 starts to move toward the left while being prevented from rotating by the slider 12 and rail member 11, and at the same time as this the output rod 16a of the booster 14 is pushed toward the left by the oil pressure of the accummulator 20. As a result, the retractable rod 6 is expanded by a propelling force exerted by the projection member 13, which is thus forcedly pressed toward the left by the booster 14, besides being forcedly pressed by the original driving force exerted by the ball-thread mechanism 3.

Figures 4, 5:
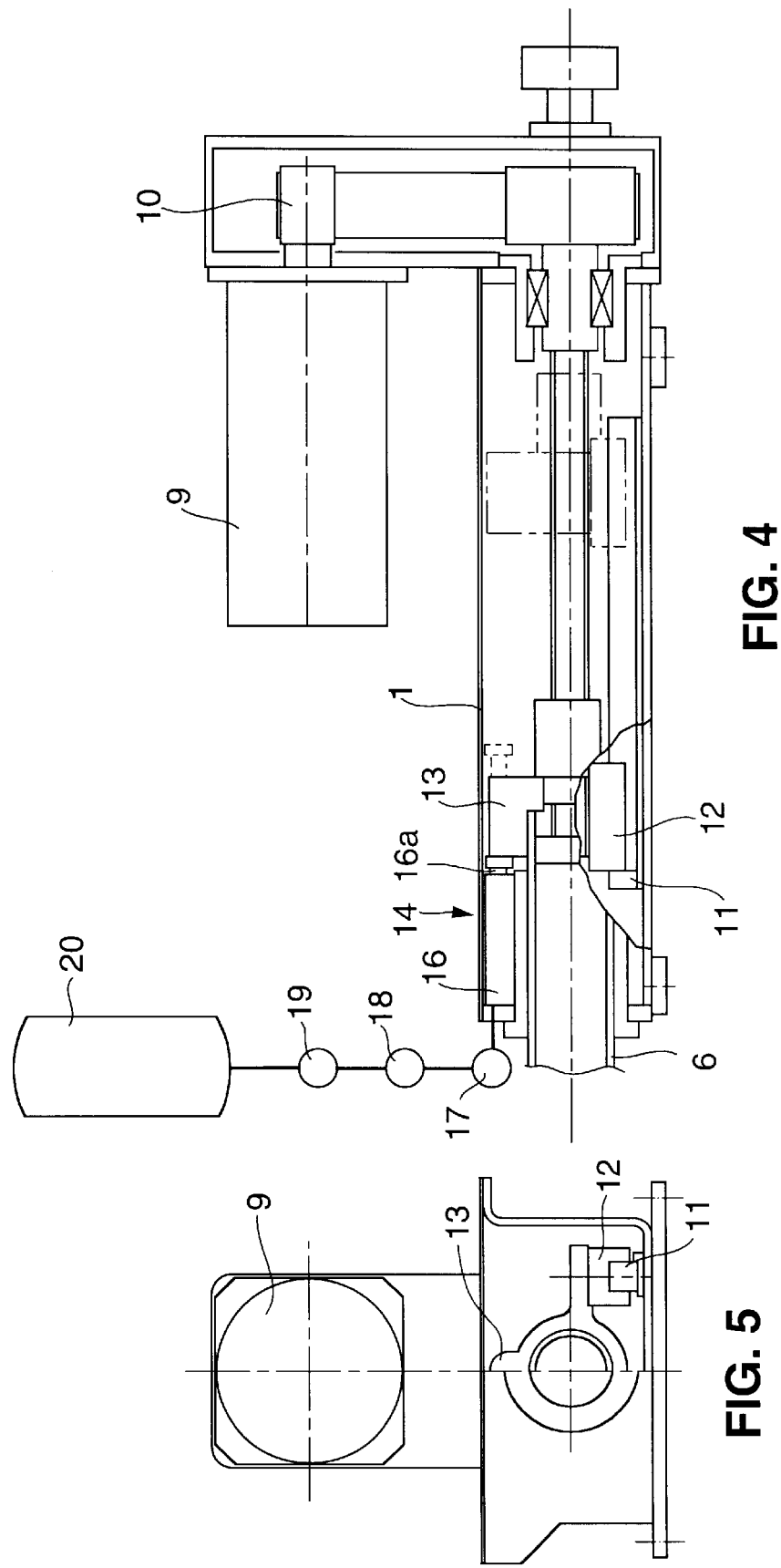
FIG. 4 is a side cross-sectional view of a variation on the FIG. 2 apparatus in which booster 14 (comprising elements 16, 16a, 17, 18, 19, and 20) is mounted at the free end of rod 6, partially cut away to show a cross-sectional view of elements 11 and 12 in a plane parallel to the plane of the rest of FIG. 4.
FIG. 5 is an end view of the FIG. 4 apparatus, partially cut away to show a cross-sectional view of elements 11, 12, and 13 in a plane perpendicular to the planes of FIG. 4.

Although in the above embodiment the booster 14 is provided only on the side where the rod contracts, effects similar to this can be obtained when it is provided on the other side, namely, the expansion side (as shown in FIG. 4).

As is clear from the above explanation, in this invention a booster is added to the retractable rod such that propelling forces exerted by both the thread mechanism and booster simultaneously act on the retractable rod. Hence, the apparatus of this invention has great effects in that a load acting on the thread mechanism at its start can be kept as low as possible so that its life is greatly prolonged over that of the conventional one.

What is claimed is:

1. A motor-operated cylinder for converting, via a thread mechanism, rotational movement of an output shaft of a motor into a linear movement, comprising:

a housing, and a hollow retractable rod which is coaxially disposed in the housing and which is propelled by the thread mechanism so that the rod is reciprocated relative to the housing, and a booster disposed at least partially in the housing and configured to assist propulsion of one, but not both, of expansion movement of the retractable rod relative to the housing, when the rod starts extending from a retracted state and contraction movement of the retractable rod relative to the housing when the rod starts contracting from an extended state.

2. The motor-operated cylinder of claim 1, wherein the booster comprises a cylinder mechanism, having a cylindrical body and an output rod translatably mounted relative to the cylindrical body for engagement with the retractable rod such that a front end of the output rod can move into a position abutting a projection member mounted on a slider which prevents the retractable rod from rotating by slidably engaging a rail member, wherein the slider is fixed to the retractable rod, and wherein the output rod is translatable relative to the cylindrical body and the housing while said output rod is engaged with the retractable rod for assisting propulsion of the expansion movement or contraction movement of the retractable rod; and a pressure mechanism, having a check valve, a throttle valve, a closing valve, and an accumulator, wherein the accumulator contains pressurized gas and is coupled through the check valve, the throttle valve, and the closing valve to the cylindrical body of the cylinder mechanism, for forcedly pushing the output rod by allowing at least some of the pressurized gas to flow from the accumulator to the cylinder mechanism thereby exerting pressure on said output rod so as to propel said expansion movement or said contraction movement of the retractable rod.

3. The motor-operated cylinder of claim 1 or 2, wherein the booster can be disposed such that the front end of the output rod starts to abut the projection when the retractable rod has moved into the retracted state, wherein the retractable rod has a free end and a back end, the back end is nearer to the thread mechanism than is the free end, and the booster is disposed at a position near the back end of the retractable rod, and wherein the pressure mechanism is capable of pushing the output rod by allowing at least some of the pressurized gas to flow from the accumulator to the cylinder mechanism thereby exerting pressure on said output rod so as to propel said expansion movement of the retractable rod.

* * * * *